United States Patent [19]

Ma

[11] Patent Number: 5,325,262

[45] Date of Patent: Jun. 28, 1994

[54] PEN BASE COMPUTER WITH DETACHABLE PERIPHERAL EQUIPMENT BOXES

[76] Inventor: Hsi-Kuang Ma, 4F, No. 48, Sec. 2, Chung Cherng Road, Taipei, Taiwan

[21] Appl. No.: 31,992

[22] Filed: Mar. 16, 1993

[51] Int. Cl.⁵ .......................... H05K 7/14; G06F 1/16
[52] U.S. Cl. ................................. 361/681; 361/683; 345/905
[58] Field of Search ............... 439/928; 248/917–923; 364/708.1; 345/169, 905; 361/680–686, 679; 312/223.2

[56] References Cited

U.S. PATENT DOCUMENTS 5,227,957  7/1993  Deters .......................... 312/223.2 X
5,278,730  1/1994  Kikinis ............................ 361/683 X Primary Examiner—Leo P. Picard
Assistant Examiner—Michael W. Phillips
Attorney, Agent, or Firm—Bacon & Thomas

[57] ABSTRACT

A sliding box type pen base computer including a flush type LCD mounted on a mother board, an IC card on the mother board, and a plurality of sliding boxes slidably fastened to the mother board beneath the LCD to carry a power supply unit, a battery box, a floppy disk drive, a hard disk drive, or any other computer peripheral equipment respectively, wherein each sliding box has a connector at one end detachably connected to either connector on a front cross bar inside the mother board, and an inward horizontal flange at an opposite end spaced at the top and hooked on a rear wing plate on the mother board for positioning.

2 Claims, 1 Drawing Sheet

PEN BASE COMPUTER WITH DETACHABLE PERIPHERAL EQUIPMENT BOXES

BACKGROUND OF THE INVENTION

The present invention relates to pen base computer of the type disclosed in related application Ser. No. 08/040,257, and more particularly to a sliding box type pen base computer.

A variety of portable computers have been proposed, and widely accepted for their advantage of mobility. A pen base computer is a newly developed compact computer which has an LCD for graphic input through a pen. Because the keyboard input device is eliminated, the size of a pen base computer is greatly reduced. Since a pen base computer is very small (may be so small that can be held in the palm), the master board and the LCD thereof may be damaged easily when frequently opening and closing the outer shell (opening the outer shell may cause a static electricity to happen, which will affect the operation of the electronic elements therein).

The inventor of the present invention invented a sliding box type pen base computer under U.S. Pat. No. 5,193,051 which eliminates the aforesaid problems. The sliding box type pen base computer according to U.S. Pat. No. 5,193,051 comprises a base and a sliding box, in which the base comprises a mother board and a liquid crystal display supported on two longitudinal side stands with a receiving chamber defined therein to receive the sliding box. The sliding box is made to slide in and out of the base, and comprises a battery box, a power supply unit, a floppy disk drive, and a hard disk drive on the inside surrounded by a vertical peripheral wall and electrically connected to the base. The present invention provides an alternate form of the sliding box type pen base computer which also effectively eliminates the aforesaid problems.

BRIEF DESCRIPTION OF THE DRAWING

The only drawing of the present invention is FIG. 1 showing an exploded view of the preferred embodiment of the sliding box type pen base computer of the present invention.

DETAILED DESCRIPTION OF THE PREFERRED EMBODIMENT

Figure 1:
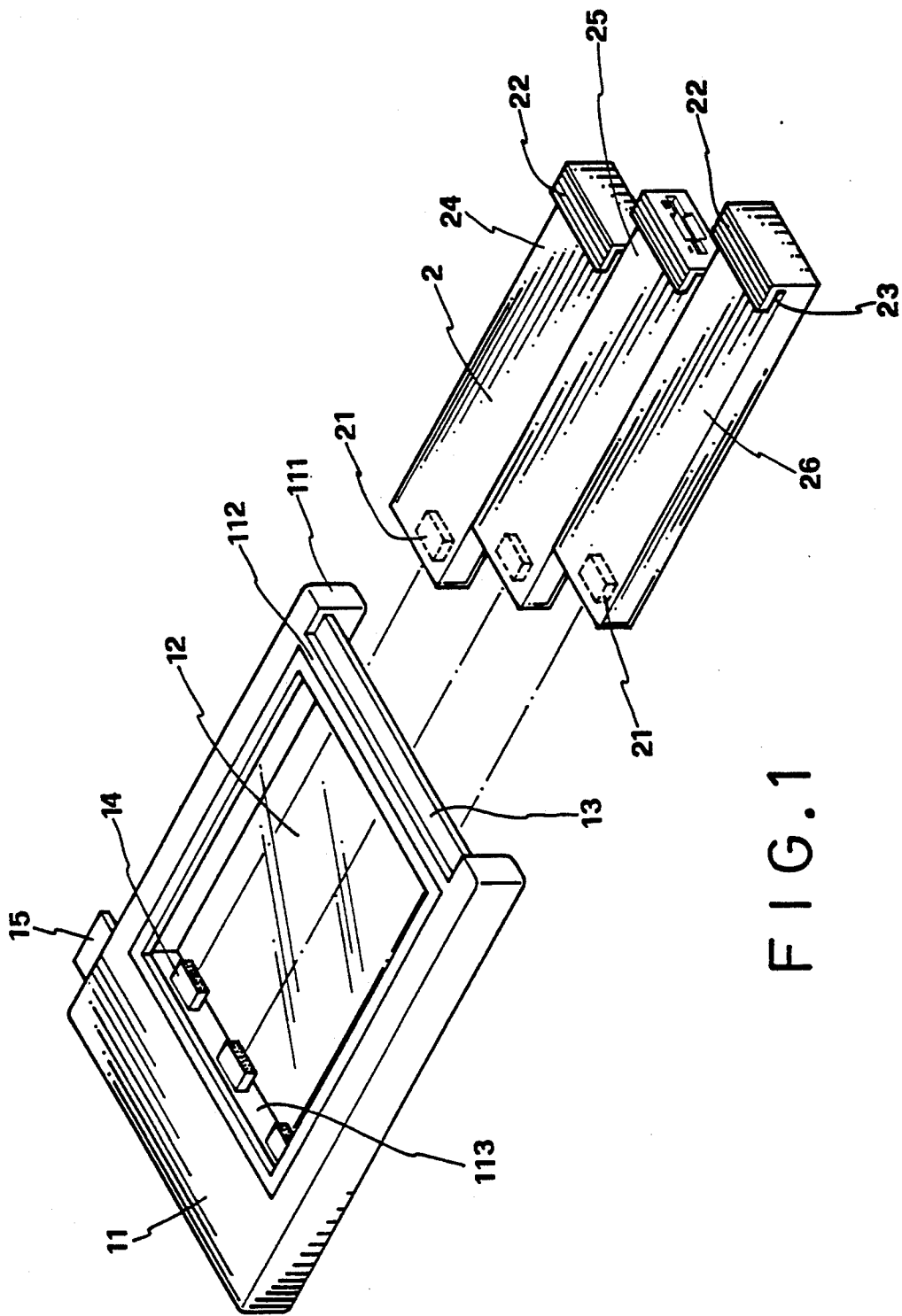

Referring to the annexed drawing in detail, a sliding box type pen base computer constructed in accordance with the present invention is generally comprised of a base 1, and a plurality of sliding boxes 2. The base 1, which is made in a flat, rectangular shape, comprises a flat top formed of a mother board 11 and a liquid crystal display (LCD) 12 and supported on two longitudinal side stands 111. The mother board 11 comprises two flush type cross bars 112 and 113 connected between the side stands 111 at two opposite ends, and a thin rear wing plate 13 connected between the side stands 111 and extending horizontally from the rear cross bar 112 at a lower elevation. The LCD 12 is mounted on the mother board 11 within the cross bars 112 and 113 and the side stands 111 in a flush manner. The front cross bar 113 is fastened with a series of connectors 14 disposed beneath the LCD 12 for electrically connecting the sliding boxes 2 to the mother board 11 electrically. The base 1 further comprises an IC card 15 at one side for connecting an external peripheral equipment.

Referring to the annexed drawing again, each sliding box 2 is made in the shape of a rectangular case having a connector 21 at one end, which is detachably connected to any of plural connectors 14 on the mother board 11, and an inward horizontal flange 22 from an opposite end spaced at the top by a transverse groove 23. The groove 23 is made in conformity with the thickness of the rear wing plate 13. After the connector 21 on each sliding box 2 has been connected to its respective connector 14 on the mother board 11, the rear wing plate 13 fits into the transverse groove 23 to hold the sliding box 2 beneath the LCD 12. On the inside of each sliding box 2, there is provided a battery box or power supply unit 24, a floppy disk drive 25, a hard disk drive 26, or any other computer peripheral equipment. Because one sliding box 2 is provided to carry one computer peripheral equipment, any unit can be separately detached from the pen base computer for quick repair when it is damaged. Further, the arrangement of the sliding boxes 2 allows different devices such as CD-ROM, TV tuning device, power supply unit, battery box, floppy disk drive, hard disk drive, etc., to be alternatively and conveniently replaced.

While only one embodiment of the present invention has been shown and described, it will be understood that various modifications and changes could be made without departing from the spirit and scope of the invention.

What is claimed is:

1. A sliding box type pen base computer comprising:
   a base including a pair of side stands, a mother board and a liquid crystal display mounted flush on a top of said mother board and supported on the side stands, said mother board including a series of connectors on a front cross bar transversely disposed at a front end thereof beneath said liquid crystal display, a flat wing transversely disposed at a rear end thereof, and an IC card at one lateral side thereof; and
   a plurality of sliding boxes detachably and slidably fastened to said base between said side stands beneath said liquid crystal display, each sliding box having a connector at one end for detachable connection to any of the series of connectors on said mother board and an inward horizontal flange at an opposite end spaced at the top by a transverse groove and hooked on said rear wing plate for positioning the sliding box.

2. The sliding box type pen base computer of claim 1 wherein said sliding boxes are each adapted to carry a power supply unit, a battery box, a CD-ROM, a TV tuning device, a floppy, or a hard disk drive.

* * * * *